United States Patent
Freiwald et al.

(10) Patent No.: US 6,874,384 B1
(45) Date of Patent: Apr. 5, 2005

(54) JOINING CONNECTION, METHOD FOR PRODUCING THE SAME, AND A STEERING COLUMN FOR MOTOR VEHICLES COMPRISING SUCH A JOINING CONNECTION

(75) Inventors: Bernd Freiwald, Moisburg (DE);
Torsten Harms, Hamburg (DE);
Hartmut Kahnert, Neu Wulmstorf (DE); Olaf Sättler, Asendorf (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/018,776

(22) PCT Filed: May 30, 2000

(86) PCT No.: PCT/EP00/04895

§ 371 (c)(1),
(2), (4) Date: Apr. 3, 2003

(87) PCT Pub. No.: WO01/02738

PCT Pub. Date: Jan. 11, 2001

(30) Foreign Application Priority Data

Jun. 29, 1999 (DE) .......................................... 199 29 957

(51) Int. Cl.$^7$ ............................................... B62D 1/18
(52) U.S. Cl. .......................... 74/493; 403/279; 280/777; 280/779
(58) Field of Search ............................... 403/278, 279, 403/284; 74/492, 493; 280/777, 779

(56) References Cited

U.S. PATENT DOCUMENTS

| | | | | |
|---|---|---|---|---|
| 5,879,099 | A | * | 3/1999 | Thoms ........................ 403/297 |
| 5,984,562 | A | * | 11/1999 | Brandenstein et al. ....... 403/279 |
| 6,044,536 | A | * | 4/2000 | Schneider .................... 29/437 |
| 6,275,556 | B1 | * | 8/2001 | Kinney et al. ............... 376/232 |
| 6,276,838 | B1 | * | 8/2001 | Lauk et al. .................. 384/537 |

FOREIGN PATENT DOCUMENTS

| | | |
|---|---|---|
| DE | 2400148 | 7/1975 |
| DE | 2622753 | 4/1979 |
| DE | 2905130 | 8/1980 |
| DE | 3616901 | 4/1987 |
| DE | 3600134 | 6/1987 |

(Continued)

OTHER PUBLICATIONS

Beitz, et al. "Taschenbuch fur den Maschinenbau" Dubbel, 1981.

(Continued)

*Primary Examiner*—David M. Fenstermacher
(74) *Attorney, Agent, or Firm*—Crowell & Moring LLP

(57) ABSTRACT

A joining connection between a circumferentially closed hollow profile and an add-on part which is provided with a passage opening and consists of a material of lower strength than the material of the hollow profile is disclosed. Additionally, a method for producing the connection and to a steering column having this joining connection is disclosed. In order to connect a hollow profile and an add-on part having lower strength than the hollow profile non-releasably to each other in a simple, reproducible and reliable manner, and furthermore in order to reliably fit a holder as an add-on part to the casing tube of the steering column, where the holder has a lower strength than the casing tube, with a low outlay on components and costs and with exact, reproducible positioning of the two joining partners with respect to each other in the joining connection, a recess is provided which is spaced away from the end sides of the add-on part on the inside of the passage opening, to slide the add-on part with its passage opening onto the hollow profile and to jam it to the hollow profile in this sliding-fit position by a local expansion of the hollow profile. The expansion being formed by internal high-pressure deformation at the location of the recess.

18 Claims, 2 Drawing Sheets

FOREIGN PATENT DOCUMENTS

| | | |
|---|---|---|
| DE | 3704092 | 8/1988 |
| DE | 3807817 | 9/1989 |
| DE | 9111065 | 2/1992 |
| DE | 9301373 | 4/1993 |
| EP | 0272511 | 6/1988 |
| FR | 964661 | 8/1950 |
| GB | 2187405 | 9/1987 |

OTHER PUBLICATIONS

Steinmuller "Taschenbuch" Dampferzeugertechnik, 1974.

Klaas, et al. "Formenvielfalt" Umfortecknik, 1994.

Copy of the International Search Report.

* cited by examiner

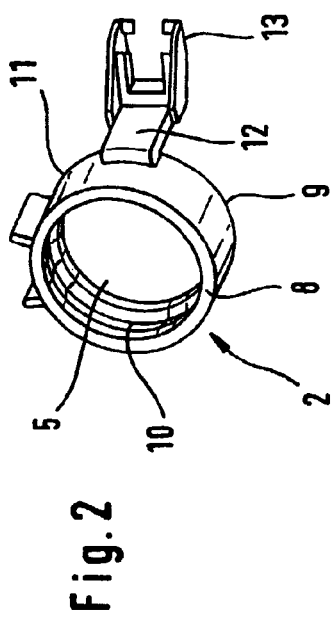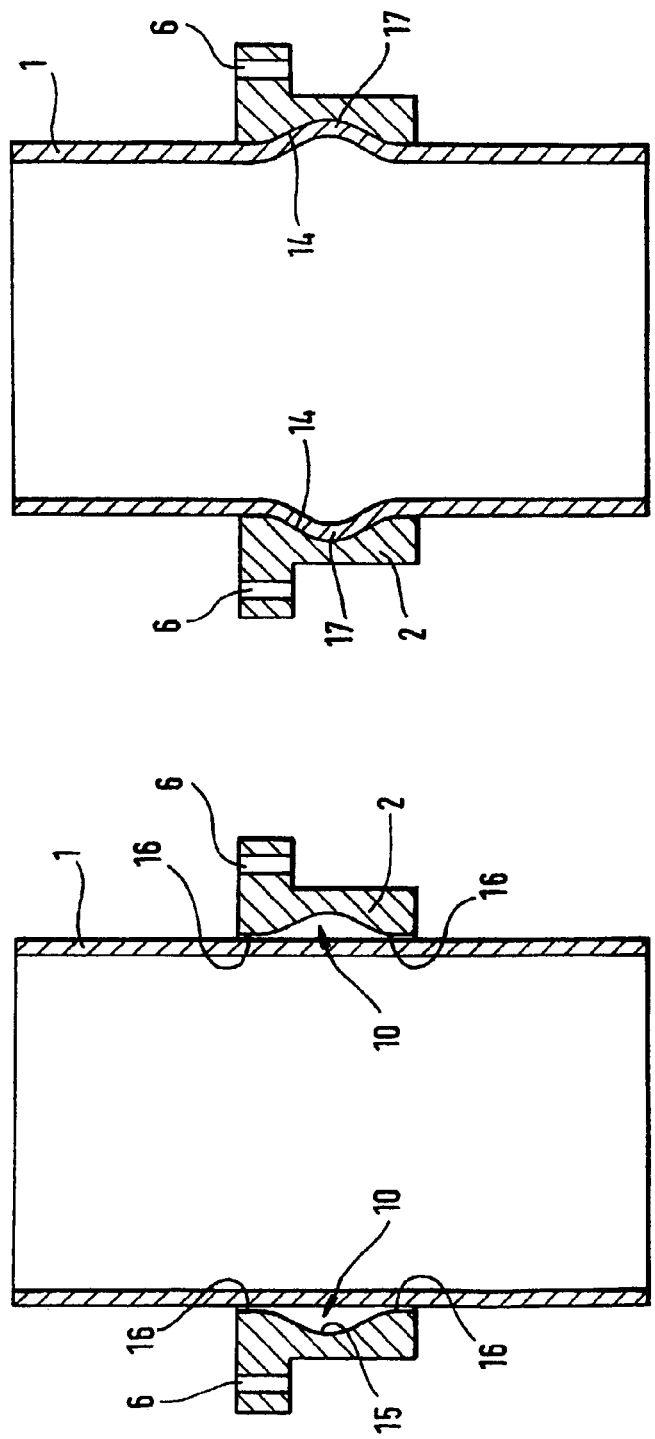

JOINING CONNECTION, METHOD FOR PRODUCING THE SAME, AND A STEERING COLUMN FOR MOTOR VEHICLES COMPRISING SUCH A JOINING CONNECTION

BACKGROUND AND SUMMARY OF THE INVENTION

This application claims the priority of German Patent Document 199 29 957.9, filed Jun. 29, 1999, and International Application No. PCT/EP00/04895, filed May 30, 2000, the disclosures of which are expressly incorporated by reference herein.

The invention relates to a joining connection and to a method for producing the same, and to a steering column of a motor vehicle.

A generic steering column is disclosed in German Patent Document DE 36 00 134 C1 whose casing tube, which consists of plastic, has injection molded integrally on it a holder for the securing of a steering column switch. The outlay on the engineering of the mold is very considerable in this case, since the injection mold has to be of very complex design. Furthermore, because of the stiffness required by the casing tube, the plastic of the casing tube is very brittle and is therefore easily breakable in the event of a crash, which may mean serious consequences in terms of health for the vehicle occupants, in particular for the driver.

In various applications, components which are exactly aligned with one another have to be secured on a hollow profile or a tube, the securing between the component and tube, i.e., the joining connection, having to withstand axial displacement forces and torsional moments. One possible joining technique is the internal high-pressure deformation technique which is used in the production of frictional connections between the component and tube, for example in the case of engineered camshafts. In this case, the components to be joined, namely the cam and tube, are first positioned with respect to each other and then the tube is partially acted upon by means of internal high pressure—delivered via an expansion lance inserted into the tube—below the cam. This results successively in flowing of the tube material, in expansion and bearing of the tube material against the cam and in the common expansion of the tube material and cam material. The pressure is set in such a manner that the cam can spring back elastically after it has been relieved of pressure. The springing-back together with a simultaneous, permanent increase in diameter of the tube enables a virtually nonreleasable, frictional joining connection to be achieved. However, a precondition for this type of joining connection is that the yield strength of the joining part, the cam, is greater than the yield strength of the tube. However, if the yield-strength ratios are reversed, the internal high pressure, which acts in an expansive manner, causes the joining part to explode relatively rapidly.

A generic joining connection and a method for production thereof is also disclosed in German Patent Document DE-A-2 400 148, in which a tube is slid through a hole in a tube plate and, after insertion into the tube of a probe provided with axially spaced sealing rings, is subjected to a pressurized liquid via a duct of the probe which first runs axially and then radially between the sealing rings. The tube is thereby expanded and becomes positioned against the hole wall of the tube plate, in which case only the surrounding region of a weld, which has been undertaken on the end side between the tube and tube plate, remains recessed. In order to obtain higher withdrawal forces, widened portions lying one behind another in the hole wall are incorporated, with the result that during the hydraulic expansion of the tube a form-fitting connection also comes about together with—as seen in the axial direction—undercuts which result in the tube becoming jammed in the hole of the tube plate. In this case, it is disadvantageous that the tube material is first of all positioned against the hole wall and only then is pressed into the widened portions, since the premature bearing enables friction to occur between the tube and the hole wall, the friction obstructing further flow of material into the widened portions. In this connection, depending on the depth of the widened portions, the material can become thinned at this point to such an extent that the tube may burst and the production reliability is thus not ensured as desired. Furthermore, the use of material for the tube plate is restricted, since, when a material having a lower yield strength than the material of the tube is used, after bearing of the tube against the hole wall the tube plate would inevitably break during further expansion into the widened portions.

The present invention is based on the object of finding a joining connection and a method for the production thereof, with which a hollow profile and an add-on part having a lower yield strength than the hollow profile can be connected non-releasably to each other in a simple, reproducible and reliable manner. Furthermore, a generic steering column is to be developed in such a manner that a holder can be reliably fitted as an add-on part to the casing tube of the steering column, the holder having a lower yield strength than the casing tube, with a low outlay on components and costs and with an exactly reproducible positioning of the two joining partners with respect to each other in the joining connection.

In accordance with the invention, because of the local expansion of the hollow profile into the recess of the add-on part and because of the bearing of the hollow profile under pre-stress as a consequence of the more extensive expansion, the add-on part obtains, at least at some points or in subregions of the recess walls of the add-on part, axial fixing and at the same time a rotationally fixed connection on the hollow profile. The non-releasable jamming of the add-on part to the hollow profile, the jamming being achieved in a simple manner merely by application of an internal high pressure in the hollow profile, requires neither additional securing elements nor a high outlay on apparatus and fitting outlay. Since the reliability of the joining method is ensured in the case of the material of the add-on part or holder, which material is low in strength (has a low yield strength) and as a result virtually does not spring back elastically after deformation, but rather is very susceptible to fracturing during the deformation, the arrangement of the recess and spacing of it away from the end sides of the add-on part or holder, which end sides lie transversely with respect to the longitudinal extent of the hollow profile or casing tube, ensure that the hollow profile material can flow into the recess without immediately resulting in an excessive contact stress acting in the radial preferred direction between the hollow profile and the add-on part, which stress would destroy the add-on part. The contact pressure of the hollow profile against the add-on part, which pressure arises in the bearing in the recess, is of a sufficient size to be able to transmit torsional moments within certain limits and therefore to achieve a sufficient torsional rigidity of the joining connection, but in turn is not so great that the add-on part—as mentioned above—would be destroyed by exploding.

Furthermore, the two joining partners, e.g., the hollow profile and add-on part, in the joining connection are, as a result of the joining using internal high pressure, coordinated with each other in a very exact and reproducible manner in their relative axial and radial positioning with respect to each other, with the result that the joining connection is virtually tolerance-free. This is of considerable importance especially when considering the tolerances of the entire construction arrangement in which the joining connection is situated, for example, the steering column.

In order to compensate for the shortening of the hollow profile during the expansion, the length of the starting part has to be dimensioned to be correspondingly larger in size. Moreover, the holder for the steering column switch in the steering column is merely representative of all possible, conceivable holders on the steering column, for example, a holder for securing the steering column on the dashboard or on a transverse support.

BRIEF DESCRIPTION OF THE DRAWINGS

Other features of the invention are evident from the dependent claims. Moreover, the invention is explained in greater detail below with reference to an exemplary embodiment illustrated in the drawings, in which:

FIG. 2 shows, in a perspective view, a holder of the steering column according to the invention;

FIG. 3 shows, in a lateral section, the add-on part from FIG. 1b in a plug-in connection according to the principles of the invention together with the hollow profile from FIG. 1a before the internal high-pressure deformation process; and FIG. 4 shows, in a lateral section, the plug-in connection from FIG. 3 after the internal high-pressure deformation process.

DETAILED DESCRIPTION OF THE DRAWINGS

Figure 1A:
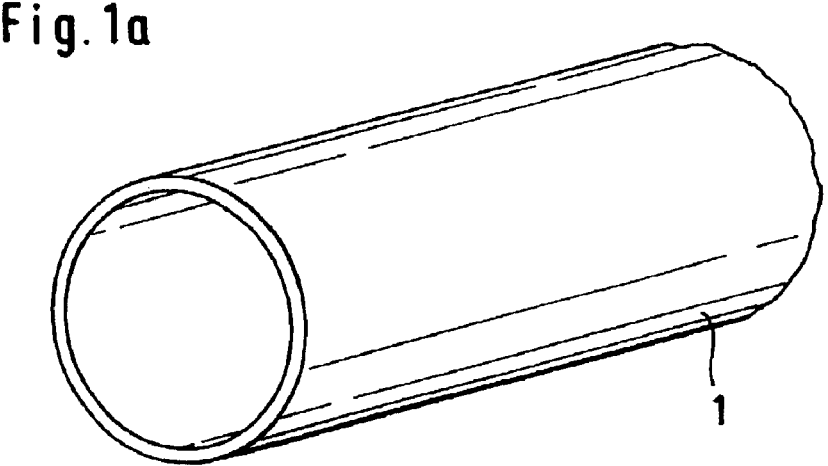
FIG. 1a shows, in a perspective view, a section of a tubular hollow profile.
Figure 1B:
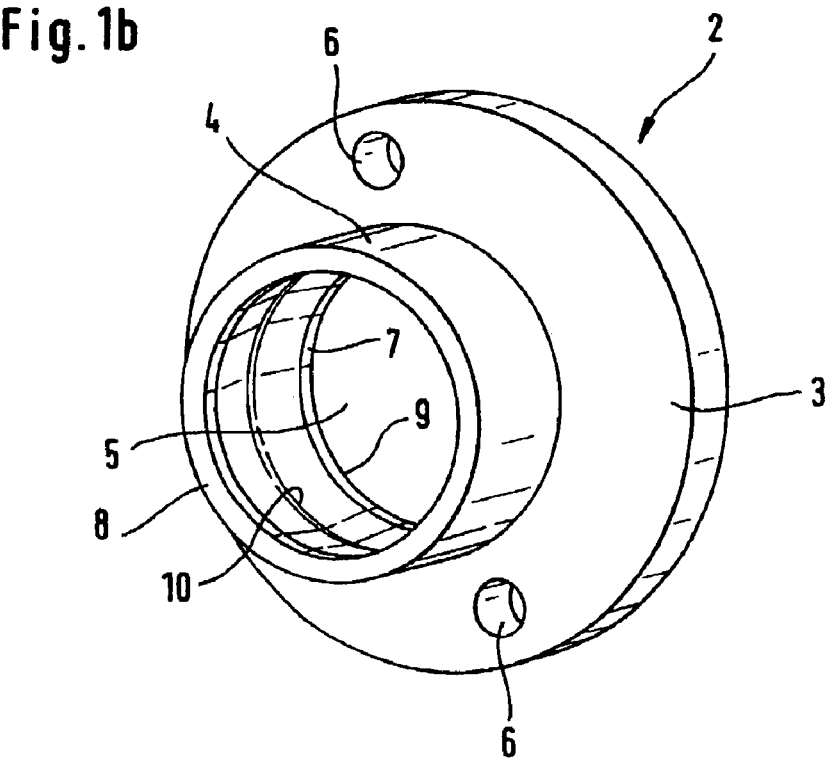
FIG. 1b shows, in a perspective view, an add-on part of the joining connection according to the invention.

FIG. 1a illustrates a circumferentially closed hollow profile 1 which consists of a ductile steel material, preferably of St 37 or St 52. FIG. 1b shows an add-on part 2 which enters into the joining connection according to the invention together with the hollow profile 1. The add-on part 2 is of annular design and consists of a low-strength casting material, of a die casting or injection molding, preferably of ZnAL4Cul, or of a low-strength steel or of a light metal material. The material is selected in such a manner that in each case it has a lower yield strength than that of the hollow profile 1. In this exemplary embodiment, the add-on part 2 has, at one end, an annular flange 3, from the center of which an introductory stub 4 having a passage opening 5 protrudes vertically. The annular flange 3 has two securing holes 6 which lie diametrically opposite each other and via which the add-on part 2, or after the joining process also the hollow profile 1, are attached to the periphery of the joining bond of hollow profile 1 and add-on part 2—in a manner fixed on the bodywork in the event of the joining bond being used in the body shell of a motor vehicle—or are secured on the joining bond via the further components. A recess 10, which may be an annular freely turned recess, is formed on the inside 7 of the passage opening 5, said recess being spaced away from the end sides 8, 9 of the add-on part 2, which end sides lie, in the sliding-fit position, transversely with respect to the longitudinal direction of the hollow profile 1 which is to be inserted.

The hollow profile 1 may, for example, be a casing tube of a steering column of a motor vehicle, which tube surrounds the steering spindle of the steering column. The steering column has a plurality of holders which form the add-on parts 2. One of these holders can be seen in FIG. 2, which holder, in a departure from the above-mentioned add-on part 2, does not have an annular flange 3, but rather consists of a ring 11 which is to be approximately equivalent to the introductory stub 4 and at whose outer circumference a material tab 12 protrudes downwards. This material tab 12 is of tong-shaped design at its free end 13 and serves as a securing element for a steering column switch.

The production of the joining connection is further described in connection with FIGS. 3 and 4. First, the selection of the materials of the joining partners hollow profile 1 and add-on part 2 is important. In this case, the hollow profile 1 consists of a ductile material which can be reliably expanded during the subsequent internal high-pressure deformation process. Most types of steel are conceivable for this purpose. The hollow profile 1 may be drawn or rolled from a sheet blank and then welded along the longitudinal seam. From the aspect of lightweight construction, in the design of the add-on part 2, use is generally made of a material which has a lower yield strength than the material of the hollow profile 1. The add-on part 2 is generally of a complicated design, depending on purpose and requirements, and so it is favorable, from the point of view of cost and against the background of a low outlay on mold and work, to cast or injection mold the add-on part 2 as a light metal cast part having a discarded core. Similarly, it can be formed by forging a lightweight steel.

In the case of production as a cast part, the recess 10 of the add-on part 2 is cast at the same time or is incorporated, preferably freely turned, in a subsequent machining process. If the add-on part 2 is forged, the recess 10 can subsequently be engraved, turned or milled out. The add-on part 2 is slid with its passage opening 5 onto the hollow profile 1 at the designated joining location, as shown in FIG. 3.

In the sliding-fit position reached, an expansion lance is then inserted into the hollow profile 1, said expansion lance having an axial hole with a fluid high-pressure generating system connected at one end and in front of which, at the other end, there branches off at least one radial duct with a discharging hole on the outer circumference of the expansion lance. The discharging hole is surrounded by two annular seals which are spaced apart axially and are arranged on the expansion lance. The expansion lance is inserted into the hollow profile 1 sufficiently far such that the discharging hole lies at the location of the recess 10 of the add-on part 2 surrounding the hollow profile 1. A pressurized fluid is then conducted via the axial hole and the radial holes of the expansion lance onto the inside of the hollow profile 1 which is expanded locally there on account of the very high fluid pressure (>700 bar) and because of its ductility.

The hollow profile material flows in this case into the recess 10 and comes to lie on the walls 14 thereof. This may take place at some points or, as can be seen from FIG. 4, with complete, form-fitting bearing. In both cases, the add-on part 2 is fixed in an axially non-releasable manner on the hollow profile 1 and is also held in a rotationally fixed manner thereon on account of the frictional connection at the bearing points. This is optimal in the case of a complete form-fitting connection, i.e., exact bearing of the hollow profile 1 against the recess walls 14 of the add-on part 2. In order to obtain the connection in a simple manner and without a subsequent calibration step which may impair the material and is therefore not reliable, the recess 10 is of curved design with a shallow rise from its base 15 as far as its edges 16 in accordance with the shaping characteristics of a free expansion of the hollow profile 1. The free expansion is distinguished in that the hollow profile 1 forms a bearing contact with the joining partner, the add-on part 2, only at the end of the expansion.

In the present invention, the expansion of the hollow profile wall on the hollow profile 1 by means of internal high pressure results in the formation of a locking element which bears over the entire surface against the recess walls 14 and jams the hollow profile 1 immovably to the add-on part 2. In this exemplary embodiment, the locking element is formed by an annular bead 17 in accordance with the design of the recess 10 as an annular groove. Otherwise, it is conceivable to form on the inside 7 one or more hollows distributed over the, circumference thereof, in place of the annular groove. This has the advantage that the form-fitting connection achieved after the internal high-pressure deformation is also effective in a radially directed fixing of the add-on part 2 on the hollow profile 1, with the result that the frictional connection in the locking plays only a subordinate role here and, as a result, even higher torsional moments than in the preceding exemplary embodiment can be absorbed. A further improvement in the durability of the joining connection with respect to mechanical loads can be achieved by roughening the inside 7 of the add-on part 2 or holder, in which the wall material of the hollow profile 1, which material flows while being subjected to the internal high pressure, can then become wedged with microprecision the locking element.

What is claimed is:

1. A joining connection comprising a circumferentially closed hollow profile and an add-on part which defines a passage opening, and, on an inside of the passage opening, defines a recess which is spaced away from end sides of the add-on part, wherein the add-on part is slid with the passage opening onto the hollow profile and jammed to the hollow profile in this sliding-fit position by an expansion of the hollow profile, the expansion being formed by internal high-pressure deformation, and further wherein the add-on part consists of a material of lower yield strength than a material of the hollow profile, and the add-on part is only jammed to the hollow profile locally at a location of the recess.

2. The joining connection according to claim 1, wherein the recess is an annular freely turned recess.

3. The joining connection according to claim 1, wherein the hollow profile consists of a ductile steel material, and the add-on part consists of one of a casting material, a die casting and an injection molding, having a lower-strength than the ductile steel or material.

4. The joining connection according to claim 1, wherein the recess is of curved design with a shallow rise extending from a base to opposing edges of the recess.

5. The joining connection according to claim 1, wherein an expanded point of the hollow profile bears in an exact manner against a wall defining the recess.

6. A method for producing a joining connection between a circumferentially closed hollow profile and an add-on part which is provided with a passage opening, a recess which is spaced away from end sides of the add-on part being formed on an inside of the passage opening, comprising the steps of sliding the add-on part with its passage opening onto the hollow profile, and expanding the hollow profile, in the sliding-fit position reached, by a fluidic internal high pressure delivered by an expansion lance inserted into the hollow profile, in such a manner that the hollow profile is jammed immovably to the add-on part, wherein the add-on part is comprised of a material of lower yield strength than a material of the hollow profile, and wherein the hollow profile is only expanded into the recess locally.

7. The method according to claim 6, wherein the recess is of curved design with a shallow rise from a base to opposing edges of the recess, and wherein the hollow profile is expanded until it bears completely against a wall defining the recess.

8. The method according to claim 6, wherein the add-on part is cast as a cast part having a discarded core and wherein the recess is cast at the same time as the add-on part.

9. The method according to claim 6, wherein the add-on part is injection molded or die cast and the recess is subsequently freely turned.

10. The method according to claim 6, wherein the add-on part is formed, in particular forged, from a low-strength steel, and wherein the recess is then engraved, turned or milled out from the add-on part.

11. A steering column of a motor vehicle comprising a casing tube which surrounds a steering spindle and forms a hollow profile, and a holder, constituting an add-on part, for example for a steering column switch, the holder joined onto the casing tube, wherein the holder, which consists of a material of lower yield strength than a material of the casing tube, defines a circumferentially closed passage opening and is slid onto the casing tube, the passage opening having, on an inside, at least one recess which is spaced away from end sides of the holder, which end sides lie transversely with respect to a longitudinal direction of the casing tube, and wherein the casing tube has a locking element which, in the sliding-fit position of the holder, is shaped radially from a wall of the holder locally at a location of the recess by a fluidic internal high pressure and is jammed in the recess as a consequence of a shape of the locking element, forming a non-releasable joining connection between the holder and the casing tube.

12. The steering column according to claim 11, wherein the locking element bears over an entire surface against a wall defining the recess.

13. The steering column according to claim 11, wherein the recess is: formed by an annular groove and the locking element is formed by an annular bead.

14. The steering column according to claim 11, wherein the casing tube consists of a ductile steel material, and the holder consists of one of a casting material, an injection molding and a die casting, having a lower-strength than the ductile steel material.

15. The steering column according to claim 11, wherein the recess is of curved design with a shallow rise from a base to opposing edges of the recess.

16. A joining connection comprising:
a circumferentially closed hollow profile; and
an add-on part defining a passage opening wherein an inside of the passage opening includes a recess which is spaced away from end sides of the add-on part;
wherein the circumferentially hollow profile is disposed within the passage opening of the add-on part and wherein the hollow profile is joined to the add-on part by an expanded portion of the hollow profile, the expanded portion of the hollow profile only received within the recess defined by the add-on part; and
further wherein the add-on part is comprised of a material of lower yield strength than a material of the hollow profile.

17. A method for producing a connection between a circumferentially closed hollow profile and an add-on part, the add-on part defining a passage opening wherein an inside of the passage opening includes a recess, comprising the steps of:
disposing the hollow profile within the passage opening of the add-on part; and
expanding the hollow profile by a fluidic internal high pressure delivered by an expansion lance inserted into the hollow profile wherein the hollow profile is only expanded into the recess, the recess spaced away from end sides of the add-on part;
wherein the add-on part is comprised of a material of lower yield strength than a material of the hollow profile.

18. A steering column of a motor vehicle comprising:

a casing tube forming a hollow profile; and a holder defining a circumferentially closed passage opening wherein an inside of the passage opening includes a recess which is spaced away from end sides of the holder;

wherein the casing tube is disposed within the passage opening of the holder and locked in position within the holder by a locking element of the casing tube that is received within the recess of the holder, the locking element of the casing tube shaped radially by a wall of the holder defining the recess and a fluidic internal high pressure applied to the casing tube, the formed locking element jammed in the recess; and wherein the holder is comprised of a material of lower yield strength than a material of the casing tube.

* * * * *